No. 651,516. Patented June 12, 1900.
W. H. STOKES.
PLANTER.
(Application filed Oct. 26, 1899.)
(No Model.)
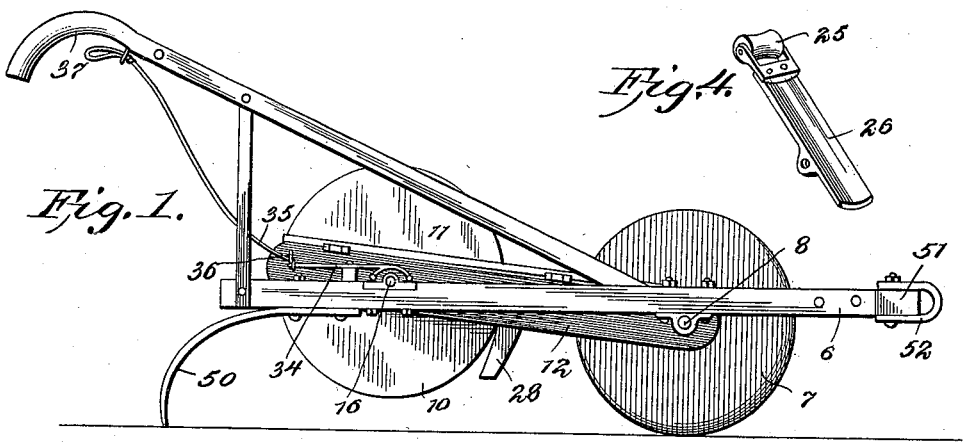
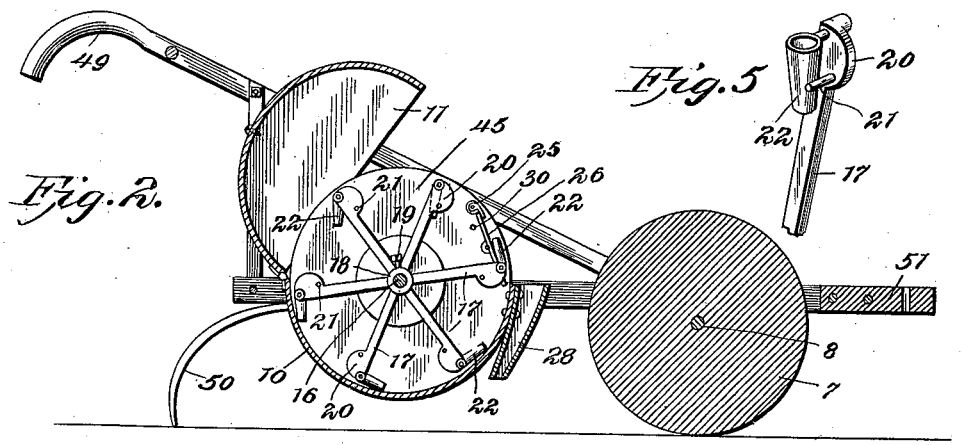
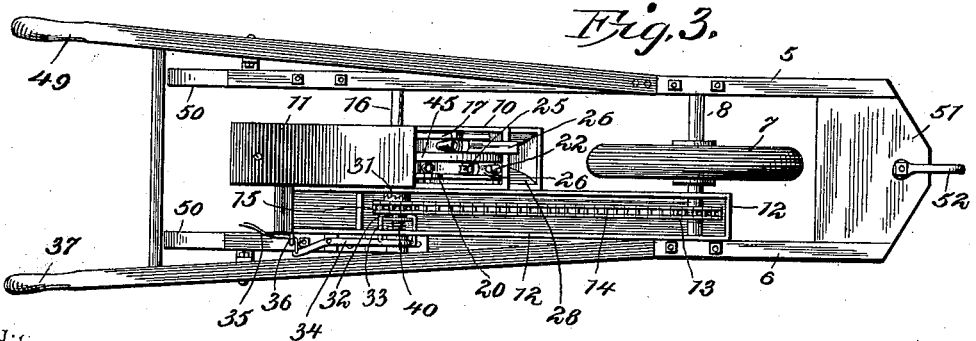
Witnesses
Howard D. Orr.
Geo. H. Chandler.
W. H. Stokes, Inventor,
By his Attorneys,
C. A. Snow & Co.

UNITED STATES PATENT OFFICE.

WILLIAM HENRY STOKES, OF ALBA, SOUTH CAROLINA.

PLANTER.

SPECIFICATION forming part of Letters Patent No. 651,516, dated June 12, 1900.

Application filed October 26, 1899. Serial No. 734,846. (No model.)

*To all whom it may concern:*

Be it known that I, WILLIAM HENRY STOKES, a citizen of the United States, residing at Alba, in the county of Greenville and State of South Carolina, have invented a new and useful Planter, of which the following is a specification.

This invention relates to planters, and more particularly to that class designed for the planting of corn or similar seed in rows, and has for its object to provide a construction in which equal quantities of seeds may be deposited at regular intervals and subsequently covered.

In the drawings forming a portion of this specification, and in which similar numerals of reference designate corresponding parts in the several views, Figure 1 is a side elevation of a planter including this invention. Fig. 2 is a longitudinal section of Fig. 3, showing a spider and its cups in elevation. Fig. 3 is a plan view with the cover of the hopper raised. Fig. 4 is a detail perspective of the tilting chute. Fig. 5 is a detail perspective of a spider-arm with a seed-cup thereon.

Referring now to the drawings, 5 and 6 represent the beams, disposed substantially parallel, and intermediate which is arranged a drive-wheel 7, fixed to a shaft 8, journaled upon the beams.

In the rear of the shaft 8 and intermediate the beams is arranged a casing or hopper 10, cylindrical in form, including its cover 11, and which hopper is fixed upon one side of a boxing 12, which extends forwardly and beyond the shaft 8 and through which said shaft is passed.

Upon the shaft 8 and within the boxing 12 is arranged a sprocket-wheel 13, having a chain 14 in engagement with a second sprocket 15 upon a shaft 16, one end of which is journaled upon the beam 6 and which shaft is disposed coaxially with the cylindrical hopper 10 and through which it extends.

Upon the shaft 16 and within the hopper 10 is disposed a spider, comprising arms 17 and a common hub 18, a set-screw 19 being passed through the hub and into engagement with the shaft to hold the spider in position. The diameter of the spider is somewhat less than the internal diameter of the hopper, and at the outer ends of the spider-arms are formed enlargements 20, in which are disposed stop-pins 21 for the purpose to be presently explained.

Pivotally mounted adjacent the outer end of each arm 17 is a preferably frustro-conical cup 22, the pivot in each instance being adjacent the open upper end of the cup, so that said cups may hang or tend to hang normally in an upright position. The pivotal connection of the cups with the spider-arms is such that when said cups are in their lowermost positions they will lie almost flat against the inner face of the hopper, the cups gradually assuming vertical positions as they are raised when the spider is rotated.

In practice a quantity of seed is supplied to the hopper and as each cup rises above the level of the seed it will contain a quantity of the seed, and the stop-pins 21 are so disposed that as each cup passes over the center of the spider its lower end will engage its respective stop-pin. Thus it will be seen that the further movement of the spider will tend to invert the cup.

In the path of the cups and in a position to pass between the pivot of each cup and its respective stop-pin is a roller 25 upon the upper end of a trough 26, pivoted within the hopper, and which trough normally lies with its discharge end adjacent a boot 28, fixed upon the outer surface of the hopper and adapted to receive the discharge from the chute and direct it to the earth. This engagement of the roller 25 with a cup moves the latter upon its pivot and into a position to deposit the seed upon the chute, after which as the spider continues to rotate the cup will pass downwardly of the outer surface of the chute, moving the lower end of the latter inwardly upon its pivot and finally passing from engagement therewith. When the cup moves from the chute, the latter returns to its normal position against a stop 30 and is ready for engagement with the next cup.

In order to connect or disconnect the spider operatively with respect to the drive-wheel 7, the sprocket 15 has a clutch member upon one face adapted for engagement with the corresponding face of a second member 31, which is fixed upon the shaft 16, the sprocket 15 being normally loose thereon. The hub of the sprocket 15 is provided with a peripheral groove 32, with which are engaged the inwardly-directed ends of fingers 33 upon a lever 34, which is pivoted to the beam 6 and has attached to its opposite end a flexible connection 35, which extends through a staple 36 and thence upwardly to one of the handles 37, carried by the beam 6 and in a position for operation by the attendant of the machine. A helical spring 40 upon the shaft 18 bears at one end against the beam 6 and at the other end against the hub of the sprocket 15 and tends to hold the clutch members normally in engagement. Thus by operation of the connection 35 the sprocket 15 will be moved against the tendency of the spring 40 to disengage it from the opposing clutch member, and when the connection is released the spring will reëstablish the connection.

The spider and cups carried thereby, as above described, are arranged at one side of a vertical partition 45 in the hopper, a second and similar spider being arranged upon the shaft 16 at the opposite side of said partition, as shown in Fig. 3 of the drawings, and which second series of cups is adapted to deposit seed upon a corresponding trough, which conveys it to the boot 28. The cups at one side of the partition 45 are arranged in an equidistant staggered relation to the cups on the other side of the partition, so that the grain from the boot may be deposited regularly. A second handle 49 is fixed to the beam 5 and attached to the beams, and extending downwardly therefrom are coverers 50, which act to cover the grain after it has fallen upon the boot.

The front ends of the beams 5 and 6 have a common connection 51, to which is pivoted a clevis 52 or other means for the attachment of a draft appliance.

When it is desired to fill the hopper, the cover thereof is raised and the seed is contributed, after which the cover may be lowered, there being permitted a slight space between the front edge of the cover and the upper edge of the wall of the hopper to permit the projection of the chutes and the passage of the seed into the boot.

It will of course be understood that in practice any desired number of cups may be used and that the sizes of the cups may be varied for different seeds and that the materials and proportions of the various parts may be altered without departing from the spirit of the invention.

Having described the invention, what is claimed as new, and desired to be secured by Letters Patent, is—

1. A planter, comprising a spider rotatably mounted within a hopper, a cup pivotally connected to the spider and adapted for movement upon its pivot to discharge its contents, and a trough in the path of movement of the cup and adapted for engagement thereby below the pivot of the cup to move the cup upon its pivot, said cup being adapted to engage the trough throughout the length thereof.

2. A planter comprising a hopper, a boot, a spider rotatably mounted within the hopper, cups pivotally connected with the spider and adapted for movement upon their pivots to discharge their contents, and a trough adapted for engagement by the cups below the pivots of the cups to tilt the cups to discharge into the trough, said trough being adapted to deliver to the boot, said cups being adapted to pass downwardly throughout the lengths of the troughs.

3. In a planter, the combination with a hopper, of a shaft rotatably mounted therein, a spider mounted upon the shaft and rotatable therewith, cups pivotally connected with the spider, a trough pivotally mounted and adapted to engage the cups and move them upon their pivots to discharge into the trough, said trough being adapted to discharge into the boot.

4. In a planter, the combination with a hopper of a spider rotatably mounted therein, cups pivotally mounted upon the spider, a trough having a roller at one end and pivoted within the hopper, said trough lying with its roller in the path of the cups and adapted to move the latter to cause them to discharge upon the trough.

5. A planter, comprising a hopper and a supporting-frame, a drive-wheel mounted in the frame, a hopper, a spider within the hopper, and provided with cups pivotally connected therewith, a tilting trough pivotally mounted within the hopper and adapted to engage the cups successively and to move them to cause them to discharge upon the trough, a sprocket connected with the drive-wheel, a second sprocket upon the spider-shaft, a chain connecting the sprockets, and means for fixing the spider to rotate with its shaft.

In testimony that I claim the foregoing as my own I have hereto affixed my signature in the presence of two witnesses.

WILLIAM HENRY STOKES.

Witnesses:
JOHN W. RISER,
W. D. METTS.